(12) United States Patent
Coney et al.

(10) Patent No.: US 8,052,377 B2
(45) Date of Patent: Nov. 8, 2011

(54) COWLING ARRANGEMENT

(75) Inventors: Michael H. Coney, Derby (GB);
Andrew J. Mullender, Nottingham (GB); Brian A. Handley, Derby (GB); David M. Parkin, Derby (GB)

(73) Assignee: Rolls-Royce PLC., London (GB)

( * ) Notice: Subject to any disclaimer, the term of this patent is extended or adjusted under 35 U.S.C. 154(b) by 1043 days.

(21) Appl. No.: 11/976,989

(22) Filed: Oct. 30, 2007

(65) Prior Publication Data
US 2008/0112796 A1 May 15, 2008

(30) Foreign Application Priority Data
Nov. 15, 2006 (GB) .................................. 0622753.2

(51) Int. Cl.
*F01D 25/12* (2006.01)
(52) U.S. Cl. .......................................... 415/115; 415/178
(58) Field of Classification Search .................. 415/144
See application file for complete search history.

(56) References Cited

U.S. PATENT DOCUMENTS
6,122,892 A * 9/2000 Gonidec et al. ............. 52/793.1

FOREIGN PATENT DOCUMENTS
| EP | 0 702 141 A2 | 3/1996 |
| FR | 2 873 167 | 1/2006 |
| GB | 1 429 240 | 3/1976 |
| GB | 2 169 696 A | 7/1986 |
| GB | 2 225 381 A | 5/1990 |

OTHER PUBLICATIONS

Rolls-Royce PLC. "The Jet Engine," 5th Edition, p. 204 (1996).

* cited by examiner

*Primary Examiner* — Richard Edgar
(74) *Attorney, Agent, or Firm* — Oliff & Berridge, PLC

(57) ABSTRACT

A gas turbine engine including a bypass duct defined by radially outer and inner walls, the radially inner wall defined by acoustic panels. The acoustic panels define the outer wall of a heated fire zone. In conventional engines an insulating blanket is attached to the panels, however, this is heavy and costly. Cooling film means are configured to pass bypass air through and over an internal surface of the panel.

8 Claims, 2 Drawing Sheets

COWLING ARRANGEMENT

The present invention relates to a cowling arrangement suitable for a bypass duct of a gas turbine engine.

An inner fixed structure (IFS) of a typical large fan engine of the Applicant's forms a boundary between an engine core fire zone and the bypass duct as shown in FIG. 1. A typical IFS is shown in 'The Jet Engine', $5^{th}$ Edition, pp 204, Rolls-Royce plc, 1986, and is normally formed from a sandwich panel arranged to attenuate acoustic energy and is manufactured from materials giving it an operational temperature limit of about 150° C. As the fire zone operates in excess of this temperature it is necessary to protect the structure thermally with a thermal blanket. However, the thermal blanket adds weight and cost to the engine and is often susceptible to failure because of poor mechanical robustness.

Therefore it is an object of the present invention to provide an alternative cooling arrangement for the IFS or core engine cowling that overcomes the above mentioned problems.

In accordance with the present invention a gas turbine engine comprises a bypass duct defined by radially outer and inner walls, the radially inner wall defined by acoustic panels that comprise outer and inner facings separated by a core, the outer facing comprises perforations characterised in that cooling film means is provided to pass bypass air through and over an internal surface of the radially inner wall.

Preferably, the cooling film means comprises an array of cooling holes defined through the inner facing.

Preferably, at least some of the cooling holes are angled α between 45 and 65 degrees.

Preferably, the core comprises a honeycomb defining discrete cells, at least some of the cells having at least one cooling hole therein.

Alternatively, the cooling film means comprises a passageway, defined by the inner wall, and a deflector plate located over an outlet of the passageway, to direct cooling air over the internal surface.

Preferably, the deflector plate comprises vanes that space the plate apart from the internal surface.

Alternatively, the deflector plate defines at least one corrugation. Preferably, the corrugation is any one of the shapes sinusoidal, triangular or rectangular and at least one corrugation extends across the plate.

Alternatively, the corrugations are radially extending.

The present invention will be more fully described by way of example with reference to the accompanying drawings in which.

Figure 1:
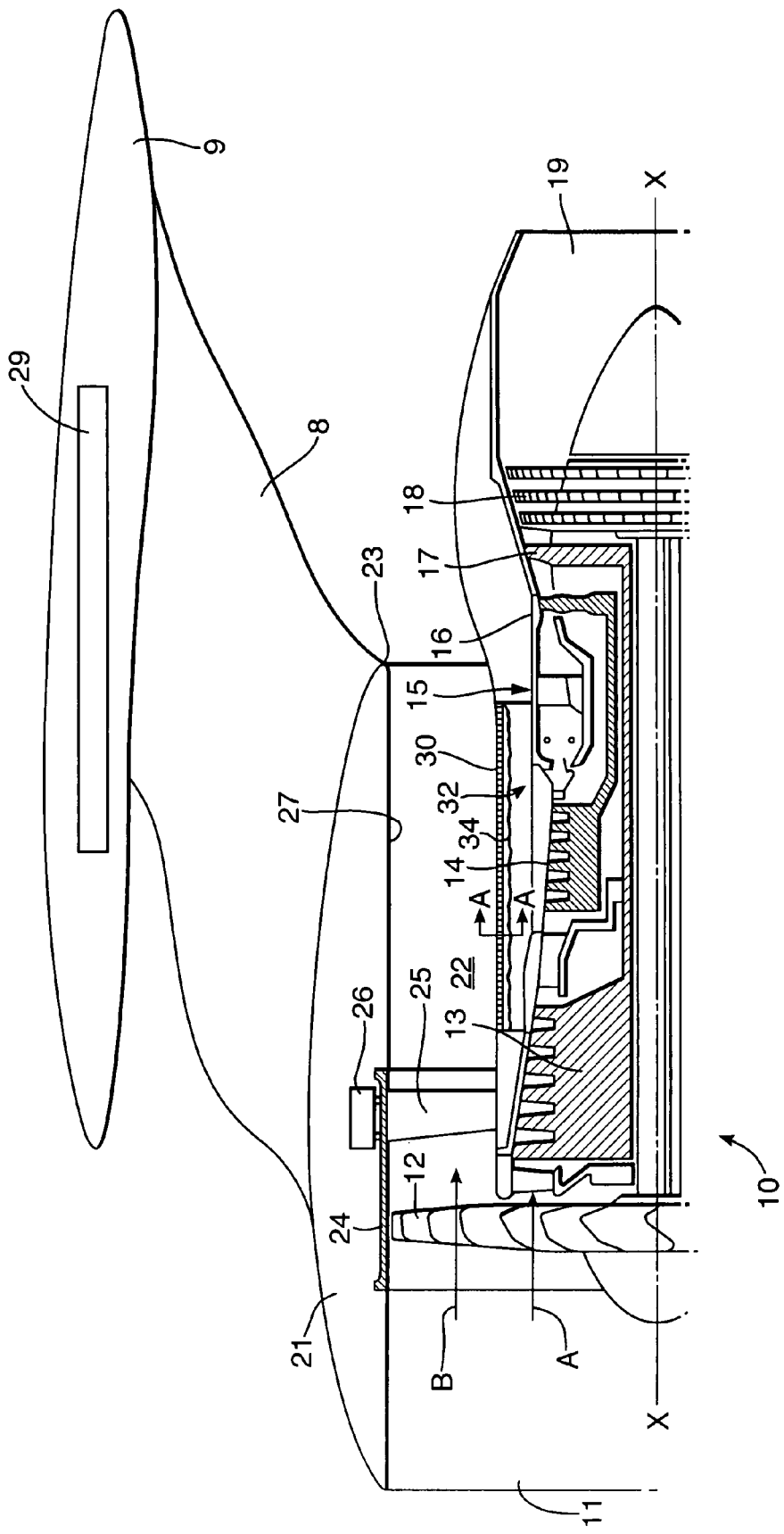
FIG. 1 is a schematic section of part of a ducted fan gas turbine engine attached to an aircraft structure.

Referring to FIG. 1, a ducted fan gas turbine engine generally indicated at 10 has a principal and rotational axis XX. The engine 10 is attached to the aircraft 9, usually to a wing or fuselage, via a pylon 8. Normally, a fuel tank 29 is housed in the wing 9.

The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core exhaust nozzle 19. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 12 to produce two air flows: a first airflow A into the intermediate pressure compressor 13 and a second airflow B which passes through a bypass duct 22 to provide propulsive thrust. The intermediate pressure compressor 13 compresses the airflow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The fan 12 is circumferentially surrounded by a structural member in the form of a fan casing 24, which is supported by an annular array of outlet guide vanes 25. Engine accessories such as the EEC 26 and oil tank are mounted on the fan casing 24.

The bypass duct 22 is defined by radially outer and inner walls 27, 30. The inner wall 30 is also known as an inner fixed structure 30 and forms a boundary between an engine core fire zone 32 and the bypass duct 22. The temperature within the fire zone often exceeds operational temperature limit of the IFS 30. Traditionally, the IFS is protected by a thermal blanket 34.

Figure 2:
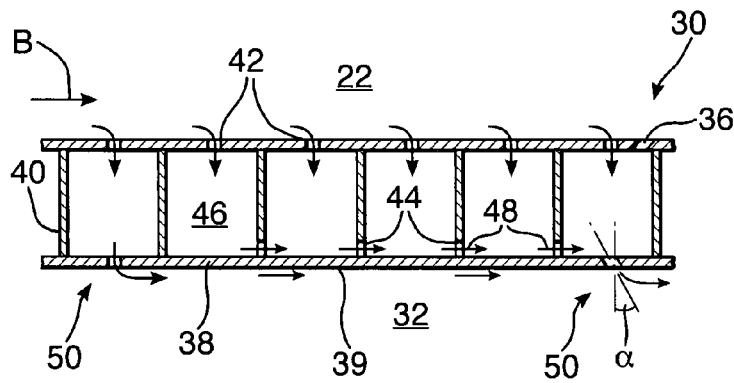
FIG. 2 is a section AA in FIG. 1 and shows a first acoustic panel comprising a cooling film means in accordance with the present invention.
Figure 3:
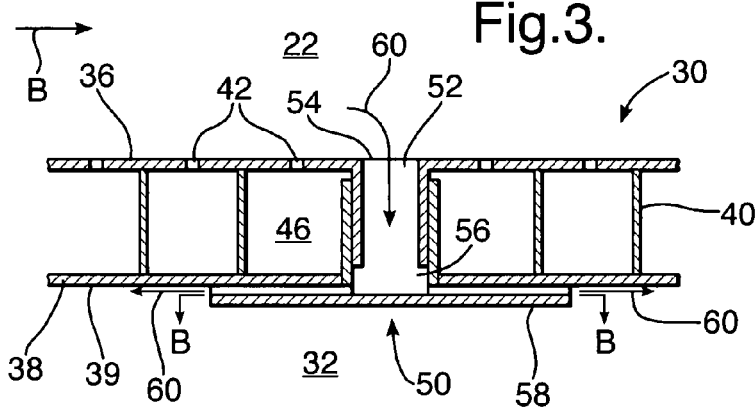
FIG. 3 is a section AA in FIG. 1 and shows a second acoustic panel comprising a cooling film means in accordance with the present invention.
Figure 4:
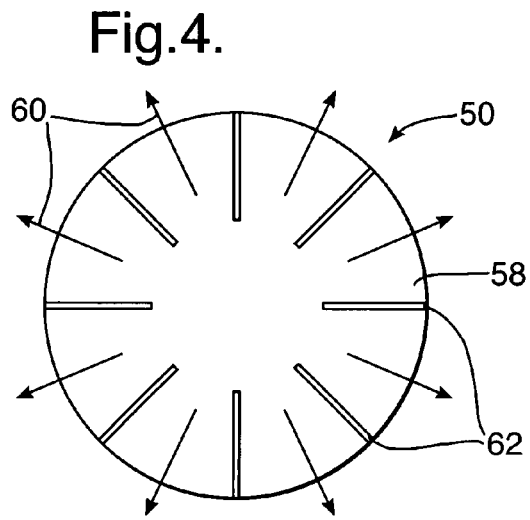
FIG. 4 is a section BB in FIG. 3 and shows a first deflector plate of the cooling film means of the second acoustic panel.

Referring now to FIGS. 2 and 3, the IFS 30 is formed from acoustic-liners comprising outer and inner facings 36, 38 and separated by a honeycomb core 40. Alternatively, the core may be any other air permeable material such as open celled foam. Acoustic pressure waves travel along the duct 22 from the fan 12. The acoustic panels comprise perforations 42 in the outer facing 36 and a cell size of the honeycomb core 40 designed to attenuate the pressure waves as known in the art.

As water and other fluids ingress the bypass duct 22 and therefore enter the cells 46 via acoustic perforations 42, drainage holes 44 are provided so that the fluid can drain away as shown by arrows 48.

The present invention relates to the provision of a cooling film means 50, which is arranged to supply a continuous film of cooling fluid over the internal surface of the inner facing 38. In this way the thermal blanket of the prior art design may be either removed or reduced in insulation therefore removing or greatly reducing associated weight and cost penalties.

An additional benefit of the present invention is that the continuous flow of bypass air removed and passed through the IFS is actually the boundary layer. The removal of air from the boundary layer of the bypass duct outer wall allows improved laminar flow and lower surface drag losses or increased flow capacity through the bypass duct itself.

In FIG. 2, the cooling film means 50 comprises perforations through the inner facing 38. The bypass air B enters the cells 46 and passes through those cells 46 having perforations through their inner facing 38 to form a cooling film of air on the internal surface 39 of the inner facing 38. The number of cells having perforations through their inner facing 38 depending on each particular application and may vary between all the cells or one in fifty cells being perforated. Each perforated cell may have more than one hole through the inner facing 38.

It is a requirement for the fire zone 32 to be ventilated. For this purpose bypass air is ducted into an upstream part of the fire zone and expelled from a downstream exit. The flow of ventilation air is generally in a downstream direction (i.e. arrow B), but may also have a component of flow around the engine. As there is a main flow direction through the fire zone 32 the film cooling air from cooling holes 50 is swept along the internal surface 39 of the inner facing 38.

To assist the film cooling air pass over the internal surface of the inner facing 38 the cooling holes 50 may be angled α in the desired flow direction. The angle α is between 45 and 65 degrees.

Where there is inadequate main ventilation air flow or a greater film cooling flow is required the FIG. 3 embodiment is particularly useful.

The cooling film means 50 comprises a passageway 52 formed through the IFS 30 having an inlet 54 in the outer facing 36 and an outlet 56 in the inner facing 38 and a deflector plate 58 spaced apart from the inner facing 38. The film cooling air 60 passes through the space and over the internal surface of the inner facing 38. The plate 58 is spaced apart from the internal surface of the inner facing 38 by an array of flow vanes 62. The flow vanes 62 smooth and direct the cooling flow 60. Although shown straight the flow vanes 62 may be arcuate to preferentially direct the cooling flow 60 at discrete areas of the internal surface 39.

An array of these cooling film means 50 are distributed around the circumference of the internal surface 39. It is possible to size the cooling film means 50, of each embodiment, such that there is a sufficient flow of cooling air to also ventilate the fire zone 32 and therefore the need to s separate ventilation air flow and ducting is not required.

Figure 5:
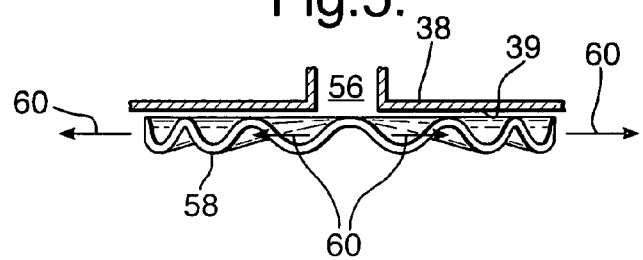
FIG. 5 is a section BB in FIG. 3 and shows a second deflector plate of the cooling film means of the second acoustic panel.

The deflector plate 58 shown is circular, but any plate shape would be appropriate as long as it defines a space with the internal surface 39, for distribution of cooling air thereover. For example, in FIG. 5 an alternative deflector plate 58 defines corrugations that extend radially outwardly from adjacent the outlet. These corrugations are generally sinusoidal in shape, but may be triangular or rectangular. The corrugations need not be regularly shaped or spaced. Furthermore, the corrugations may extend straight across the plate 58 so as to direct cooling flow in two main directions.

We claim:

1. A gas turbine engine comprising:
    a core;
    the radially inner wall defined by
    acoustic panels that include outer and inner facings separated by the core, the outer facing including perforations;
    a radially inner wall including an internal surface and being defined by the acoustic panels;
    a radially outer wall;
    a bypass duct defined by the radially outer wall and the radially inner wall; and
    cooling film means configured to pass bypass air through and over the internal surface of the radially inner wall, wherein the cooling film means including:
        a deflector plate including vanes or corrugations that space the plate apart from the internal surface of the radially inner wall, and
        a passageway having an outlet, the passageway being defined by the radially inner wall and the deflector plate, the deflector plate being located over the outlet of the passageway to direct cooling air over the internal surface.

2. The gas turbine engine of claim 1, wherein the cooling film means further includes an array of cooling holes defined through the inner facing.

3. The gas turbine engine of claim 2, wherein at least some of the cooling holes are angled α between 45 and 65 degrees.

4. The gas turbine engine of claim 2, wherein the core includes a honeycomb defining discrete cells, at least some of the cells having at least one cooling hole therein.

5. The gas turbine engine of claim 1, wherein the deflector plate defines at least one corrugation.

6. The gas turbine engine of claim 5, wherein the at least one corrugation is any one of the shapes sinusoidal, triangular or rectangular.

7. The gas turbine engine of claim 5, wherein the at least one corrugation extends across the plate.

8. The gas turbine engine of claim 5, wherein the at least one corrugation is radially extending.

\* \* \* \* \*